UNITED STATES PATENT OFFICE.

THEODOR DIEHL, OF MANNHEIM, GERMANY, ASSIGNOR TO G. C. ZIMMER, OF SAME PLACE.

CRIMSON DYE.

SPECIFICATION forming part of Letters Patent No. 401,483, dated April 16, 1889.

Application filed October 6, 1888. Serial No. 287,396. (No specimens.)

*To all whom it may concern:*

Be it known that I, THEODOR DIEHL, a subject of the Emperor of Germany, residing at Mannheim, Germany, have invented new and useful Improvements in Coloring-Matter, of which the following is a specification.

I have discovered that the monosulpho-acid obtained from beta-phenylnaphthylamine (Beilstein in *Handbuch der Organischen Chemie*) can be used for the manufacture of coloring-matters by combining it with tetrazo-diphenyl or tetrazo-ditolyl.

The new coloring-matters dye cotton in the soap-bath and are remarkable for their blue shade and their permanent nature.

The reaction goes forward in two phases or steps, the first step being the combination of one molecule of the said monosulpho-acid with one molecule of the tetrazo salt to an insoluble compound, and the second step being the combination of said insoluble compound with another molecule of the said monosulpho-acid to the coloring-matter. The said second molecule of monosulpho-acid can be substituted by phenols or amides or their sulpho or carbon acids.

1. *Coloring-matter from benzidine plus two molecules of beta-phenylnaphthylamine monosulpho-acid.*—Twenty-eight kilos of benzidine sulphate or the equivalent quantity of any other benzidine salt are diazotized in a solution of six hundred liters water with fourteen kilos nitrite by the addition of forty kilos of hydrochloric acid. The tetrazo compound formed is poured into a solution of sixty-four kilos beta-phenylnaphthylamine sulphonate of soda in about nine hundred liters of water, to which is added so much acetate of soda that all mineral acid is neutralized. After about twelve hours stirring the reaction will be complete, the separated coloring-acid is converted into its soda salt, and this is salted out.

The coloring-matter, which dissolves with difficulty, dyes cotton with a crimson tint.

2. *Coloring-matter from benzidine plus beta-phenylnaphthylamine sulpho-acid plus naphthionic acid.*—Twenty-eight kilos benzidine sulphate are diazotized, as described. The solution of the tetrazo compound is poured under stirring into thirty-two kilos beta-phenyl-naphthylamine sulphonate of soda and thirty-five kilos acetate of soda dissolved in about six hundred liters of water. The brown intermediate product formed is introduced into a solution of twenty-six kilos naphthionate and ten kilos carbonate of soda in about nine hundred liters of water. After stirring for twelve hours the coloring-solution is boiled and filtered and the coloring-matter then salted out. It dyes cotton a fine blueish red.

3. *Coloring-matter from toluidine plus beta-phenylnaphthylamine sulpho-acid plus naphthionic acid.*—If in the foregoing example the benzidine sulphate is replaced by thirty-one kilos of toluidine sulphate, a coloring-matter is produced which is considerably bluer.

4. *Coloring-matter from benzidine plus beta-phenylnaphthylamine sulpho-acid plus salicylic acid.*—By combining the intermediate product described in example 2 with sixteen kilos salicylate of soda in alkaline solution a red orange will be obtained.

5. *Coloring-matter from benzidine plus beta-phenylnaphthylamine sulpho-acid plus beta-naphthol disulpho-acid.*—If the intermediate product obtained from benzidine and beta-phenylnaphthylamine sulpho-acid is made to react upon beta-naphthol disulpho-acid (R. salt) in alkaline solution, a bluish-violet coloring-matter will be obtained.

6. *Coloring-matter from benzidine plus beta-phenylnaphthylamine sulpho-acid plus alpha-naphthol alpha sulpho-acid.*—If, instead of R. salt in example 5 alpha-naphthol alpha-sulpho acid is used, the resulting coloring-matter is considerably bluer than the foregoing.

I claim—

1. The process of obtaining a compound that yields coloring-matter when subjected to the action of phenols, amines, or other sulpho or carbon acids, which consists in combining one molecule of beta-phenylnaphthylamine monosulpho-acid with one molecule of a tetrazo salt, substantially as herein set forth.

2. The process of obtaining coloring-matter that dyes unmordanted cotton directly, which consists in first combining one molecule of beta-phenylnaphthylamine monosulpho-acid with one molecule of a tetrazo salt and afterward subjecting the obtained product of said
5 combination to the action of phenols, amines, or other sulpho or carbon acids, substantially as herein set forth.

In testimony whereof I have signed my name to this specification in the presence of two subscribing witnesses.

THEODOR DIEHL.

Witnesses:
FRIEDR. ZINKGRAEF,
FRIEDR. BAUMSTADT.